Feb. 2, 1965 R. SPIETH 3,168,338
CLAMPING DEVICE
Filed Nov. 19, 1962
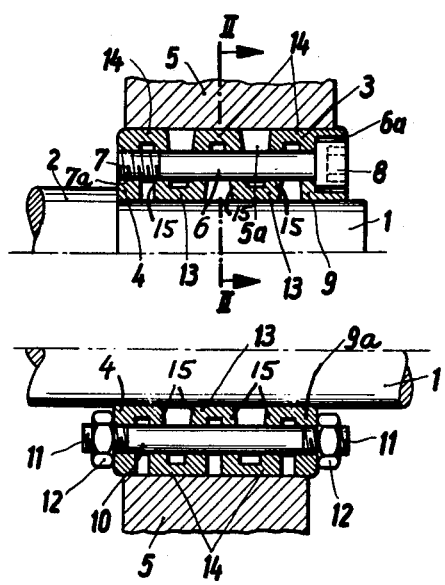
Fig.1
Fig.3
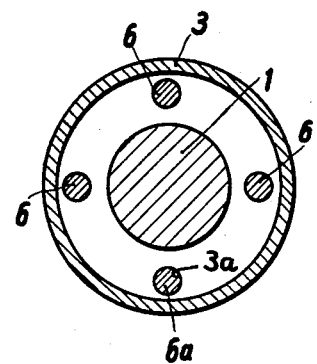
Fig.2
Inventor:
Rudolf Spieth
By

United States Patent Office 3,168,338
Patented Feb. 2, 1965

3,168,338
CLAMPING DEVICE
Rudolf Spieth, Kennenburger Str. 40–42,
Esslingen (Neckar), Germany
Filed Nov. 19, 1962, Ser. No. 238,675
5 Claims. (Cl. 287—52)

The present invention relates to a clamping device, and more specifically, to a dish spring-like clamping device for clamping work pieces and the like onto a clamping mandrel.

With heretofore known clamping devices of the type involved in which dish spring-like clamping bushings are deformed by axial pressure in radial direction, the arrangement is usually such that one end of the clamping bushing rests against an abutment firmly connected to the mandrel, for instance a fixed collar or a screwed-on ring or the like, while it is pressed together by a threaded ring screwed onto the other end of the mandrel, or by a nut or the like.

It is an object of the present invention to provide a dish-shaped clamping device which will be independent of abutments or threads of the clamping mandrel or the shaft.

It is another object of this invention to provide a clamping device as set forth in the preceding paragraph, which will have a wide field of application.

These and other objects and advantages of the invention will appear more clearly from the following specification in connection with the accompanying drawing, in which:

FIGURE 1 illustrates an axial section through a clamping bushing according to the invention with a unilateral screwed-on clamping bolt having a countersunk head;

FIGURE 2 is a section taken along the line II—II of FIGURE 1;

FIGURE 3 is an axial section through a different embodiment according to the present invention.

According to the present invention, the clamping means, more specifically, the screw means required for the clamping operation are directly connected to the clamping bushing. These clamping bolts may have one end thereof provided with a thread by means of which these bolts are screwed into a corresponding thread of the last supporting wall of the bushing. In this instance, the bushing advantageously rests against a fixed abutment. However, instead of the just-described arrangement, threaded bolts may be employed as clamping means which are provided at both ends with threads and which with slight clearance extend through the axial bores in the radial supporting walls. Nuts of customary type are screwed on the threads at both sides of said bolts. Also combinations of these two types of clamping means may be employed without in any way affecting the essence of the present invention.

Referring first to the embodiment of FIG. 1, the arrangement shown therein comprises a clamping mandrel or shaft means 1 having an abutment 2 at one end. It is against this abutment that the last supporting wall 4 of a bushing 3 rests. Bushing 3 furthermore comprises axially extending inner wall sections 13 and axially extending outer wall sections 14 as well as radially extending supporting wall sections 9 and 15. FIG. 1 furthermore shows a work piece 5, such as a pulley which is to be clamped by the clamping bushing 3 to shaft means 1.

As will be evident from FIG. 2, the bushing 3 has, for instance, four bores 3a circumferentially offset with regard to each other by 90°. Screw bolts 6 extend through said bores 3a. One end of bolt 6 is provided with a thread 7 respectively engaging a correspondingly threaded bore 7a of the last supporting wall 4. The other ends of said bolts 6 are provided with a head 8 respectively arranged in corresponding recesses 6a in the first supporting wall 9. By tightening the bolts 6, an axial pressure is exerted upon the bushing 3 as a result of which the axial parts 13 and 14 of the bushing will be pressed at a corresponding pressure against mandrel 1, while the peripheral surface of bushing 3 will be pressed against the inner wall 5a of the work piece 5. The pressure exerted on the bushing causes the frusto-conical substantially radially extending wall parts 15 that interconnect the inner parts 13 and outer parts 14 of the bushing to press the said inner and outer parts away from each other to effect the clamping referred to.

According to the embodiment of FIG. 3, the head bolts 6 according to FIG. 1 have been replaced by screw bolts 10 having both ends thereof provided with a thread 11 onto which screw nuts 12 have been screwed. By tightening these nuts, an elastic deformation of bushing 3 is obtained, as is required for clamping work pieces 5 onto the mandrel 1. In this instance, an abutment for supporting the bushing is not necessary at either end of the bushing.

It is, of course, to be understood that the present invention is, by no means, limited to the particular construction shown in the drawing, but also comprises any modification within the scope of the appended claims.

What I claim is:

1. A clamping device for clamping machine elements such as pulleys and the like to shafts and mandrels, which includes: a clamping bushing comprising axially extending spaced coaxial cylindrical inner wall sections for mounting on a shaft means and also comprising axially extending spaced coaxial cylindrical outer wall sections for being received in a bore in the element to be clamped, said bushing furthermore comprising frusto-conical substantially radially extending wall sections spaced from each other in axial direction of said bushing and respectively interconnecting the ends of said inner and outer axially extending wall sections, said radially extending wall sections being provided with axially extending bores therethrough, and bolt means extending through said bores and being operable to reduce the spacing of said radially extending wall sections from each other to thereby increase the outer diameter of said outer wall sections and to decrease the inner diameter of said inner axially extending wall sections for respectively clamping said element to said shaft means.

2. A clamping device for clamping machine elements such as pulleys and the like to shafts and mandrels, which includes: a clamping bushing comprising axially extending spaced coaxial cylindrical inner wall sections for mounting on a shaft means and also comprising axially extending spaced coaxial cylindrical outer wall sections for being received in a bore in the element to be clamped, said bushing furthermore comprising frusto-conical substantially radially extending wall sections spaced from each other in axial direction of said bushing and respectively interconnecting the ends of said inner and outer axially extending wall sections, said radially extending wall sections being provided with axially extending bores therethrough, a terminal radially extending wall section at each end of the bushing forming the end faces of said bushing and one of said end faces having bores extending therethrough provided with a thread, and bolt means extending through said bores and having one end thereof provided with a thread threadedly engaging the thread in said radially extending wall section forming said one end face, said bolt means having the other end provided with a head engaging that radially extending wall section forming the other end face of said bushing, said bolt means being operable to reduce the spacing of said radially extending wall sections from each other to thereby increase the outer diameter of said outer wall sections and to decrease the inner diameter of said inner axially extending wall sections for respectively clamping said element to said shaft means.

3. A clamping device according to claim 2, in which the radially extending wall section adjacent the heads of said bolt means is provided with recess means for receiving said heads.

4. A clamping device for clamping work piece on a mandrel, which includes: a clamping bushing comprising axially extending inner wall sections for mounting on a mandrel and also comprising axially extending outer wall sections for receiving the work piece to be clamped, said bushing furthermore comprising radially extending wall sections spaced from each other in axial direction of said bushing and respectively interconnecting said inner and outer axially extending wall sections, said radially extending wall sections being provided with axially extending bores therethrough, bolt means extending through said bores and having both end portions of said bolt means provided with a thread extending at least partially beyond the end faces of said bushing, and nut means threadedly engaging the threaded end portions of said bolt means and resting against the end faces of said bushing.

5. A clamping device according to claim 1, in which the bores extending through said radially extending wall sections are circumferentially uniformly spaced from each other, said bolt means extending through said bores with slight clearance.

References Cited by the Examiner

UNITED STATES PATENTS

| | | | |
|---|---|---|---|
| 2,630,039 | 3/53 | Klemm | 279—2 |
| 2,764,896 | 10/56 | Arthur | 287—52.06 |
| 2,801,858 | 8/57 | Spieth | 279—2 |
| 2,824,744 | 2/58 | Peters | 279—2 |
| 2,989,327 | 6/61 | Hermanus | 279—2 |
| 2,999,394 | 9/61 | Firth | 279—52.6 |

FOREIGN PATENTS 1,131,486  6/62  Germany.

ROBERT C. RIORDON, *Primary Examiner.*